United States Patent Office 3,737,381
Patented June 5, 1973

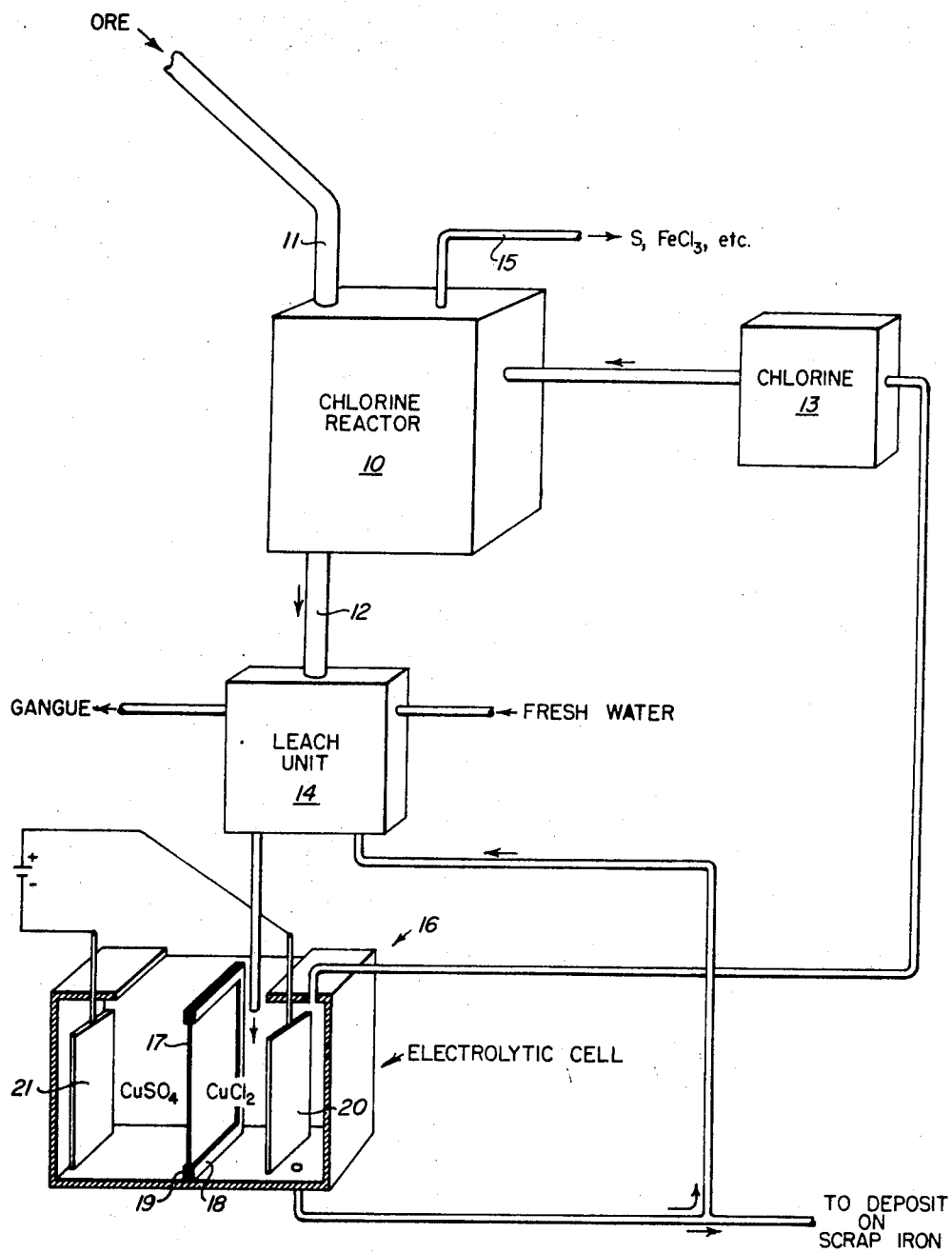

3,737,381
APPARATUS FOR TREATING COPPER ORES
Merwin G. White and Donald M. White, Salt Lake City, Utah, assignors to Mutual Mining and Refining, Ltd., Vancouver, British Columbia, Canada
Original application Dec. 18, 1967, Ser. No. 691,630, now Patent No. 3,537,961, dated Nov. 3, 1970. Divided and this application July 2, 1970, Ser. No. 60,958
Int. Cl. B01k 3/10; C22d 1/08
U.S. Cl. 204—263                                    1 Claim

ABSTRACT OF THE DISCLOSURE

Copper bearing ore is chlorinated in a closed combustion furnace at between 350° C. and 600° C. to volatilize the sulfur and iron constitutents and to yield a water soluble copper chloride residue. The residue is leached with water and the copper chloride goes into solution. The solution is placed as an anolyte in an electrolytic cell that is divided by a cationic exchange membrane having copper sulfate as a catholyte, and copper is plated out at the cathode. The chloride decomposes to chlorine and is expelled at the anode, from where it can be recovered and recycled.

BRIEF DESCRIPTION

This application is a division of application Ser. No. 691,630, filed Dec. 18, 1967, now Pat. No. 3,537,961.

This invention relates to the treatment of copper bearing ores or concentrates. In the past, it has been common to recover copper from certain copper bearing ores by leaching oxidized copper with sulfuric acid. After leaching, the solution is treated to remove or reduce impurities and thereafter is subjected to electrolysis. It has also been common to electrolytically refine copper produced by smelting. This requires smelting and converting equipment and necessitates placing the copper in a suitable acid solution for use as an electrolyte. With these known processes, the resultant copper is of very high grade. However, the apparatus is very expensive, with the acid copper sulfate leach solutions being corrosive and necessitating that all pipes, pumps, storage vats, etc., be made of special acid-resisting materials.

Principal objects of the present invention are to provide a process for electrowinning copper from copper ores, that does not require the use of an acid leaching agent and hence does not require the expensive apparatus used to handle acid solutions; and to provide such a process that does not require smelting or converting.

With the present invention, it is believed that plants can be built to process copper bearing ores for approximately one-sixth of the installation cost of plants such as have been heretofore constructed.

It has long been known that chlorination, i.e. treatment with active chlorine compounds such as gaseous or liquid chlorine, chlorinated hydrocarbons, and sulfur chlorides; and chloridation, i.e. treatment with inorganic chlorides such as sodium chloride, of ores, will frequently aid in the purification, separating or extracting of various metals. However, because of the high cost of the chlorine expended, and because selective volatilization of their chlorides is usually required before the metals sought are sufficiently pure, these known processes have generally been limited to use in the recovery of valuable metals such as uranium, titanium, manganese, tungsten, etc. Furthermore, it has generally been considered necessary to carry out chlorination reactions at very high temperatures, i.e. 1000° C. or higher, and it has therefore been necessary that special furnaces, made of materials not subject to excessive attack by chlorine at the temperatures employed, be used.

Another object is, therefore, to provide a chlorination process that can be economically used in the recovery of copper.

Heretofore, electrolytic recovery of copper from chloride solutions has not been possible. This is because the oxidation potential of cuprous chloride is lower than that of copper and cuprous chloride rather than copper accumulates at the cathode. Precipitation on scrap iron can be used, but the resultant cement copper is impure. Also, this process is becoming more and more costly as the price of scrap iron increases. Other chemical recovery processes are also known, but they do not give a pure metallic copper, nor do they provide for recovery of the chlorine used.

Thus, it is another object of this invention to provide a process whereby metallic copper can be economically recovered from cupric chloride soltuions, with the chlorine used being recycled.

Still another object of the invention is to provide a process for the recovery of copper wherein sulfur and water soluble chlorides of other metals can be readily obtained as by-products of the copper recovery.

Principal features of our invention include the chlorination of copper bearing ores at temperatures below those at which the chlorine reacts with the materials of the furnace to destroy the furnace, the use of water as a leaching agent; and the use of an electrolytic cell divided by a cationic exchange membrane to separate the cupric chloride anolyte formed by the leaching and copper sulfate or other suitable catholyte from which copper can be plated. The membrane permits copper ions to migrate toward the cathode, but not anions such as chloride ions, which migrate to the anode to be discharged as chlorine gas that is then recovered and recycled to the chlorinating furnace.

Additional objects and features will become apparent from the following detailed description and the drawing, disclosing what is presently contemplated as being the best mode of the invention.

THE DRAWING

The single figure of drawing shows the preferred apparatus of the invention, schematically arranged to carry out the process of the invention, and with a side wall of the electrolytic cell removed for clarity.

DETAILED DESCRIPTION

Referring now to the drawing:

As illustrated, copper bearing ore is charged into a chlorine reactor 10, at 11, and is discharged therefrom, after chlorination, through discharge conduit 12. The ore will normally be pre-crushed to insure effective chlorination and, if necessary, or desirable, will be pre-concentrated. The chlorine reactor can be a tube furnace or other known furnace in which temperatures of from 250° C. to 600° C. can be maintained. Chlorine for the reactor is supplied from a source 13 and each charge is subjected to the hot chlorine for a length of time sufficient to allow for thorough chlorination of the ore. In practice, it has been found best to subject thin layers of chalcopyrite ore to chlorination for at least thirty minutes, within the specified temperature range. At temperatures below 350° C. there is insufficient chlorination to make the process economically worthwhile when the ore being treated is chalcopyrite and at temperatures above 600° C. the copper is volatilized and cannot be leached by the leach soltuion contained in vessel 14. The chlorination of chalcopyrite ore results in a water soluble copper chloride that is discharged from the furnace into the conventional counter-current type wash vessel 14 to be leached, and in volatilized materials such as sulfur and some ferric chloride, which are removed from the furnace through a conduit 15, and which are subsequently processed in known manner. Other copper bearing ores can be successfully chlorinated economically at temperatures down to 250° C. and their volatilized constituents can also be recovered for processing.

The water soluble copper chloride is leached in vessel 14 and the gangue is removed. The remaining liquor is then placed in the anode side of an electrolytic cell 16 that is divided by a cationic exchange membrane 17, supported between two frames 18 and 19.

The cationic exchange membrane is stretched tautly between the frames, and the frames are sealingly secured to the side walls and bottom of cell 16, such that the frames and membrane form a sealed barrier between opposite ends of the cell.

The anode 20 is suspended downwardly into cell 16 at one side of the membrane 17 and a cathode 21 is similarly suspended in the other end. While other suitable materials can be used, vessel 16 is desirably made of plastic, the frames 18 and 19 are of Plexiglas, the anode is of graphite and the cathode is a copper starting sheet. The cationic exchange membrane can be an Ionac MC–3470 membrane or other membrane having similar properties.

The catholyte is preferably a cupric sulfate solution to which a plating additive may be added and the anolyte can be either a CP solution of cupric chloride or, preferably, the cupric chloride leach liquor. Other solutions can be used as the catholyte, since it is only necessary that the solution contain copper ions that will plate out during electrolysis and that will be replenished by copper ions migrating through the exchange membrane. However, because it is easy to handle and relatively inexpensive, a copper sulfate solution is preferred.

In practice, when the system is energized, the copper ions migrate toward the cathode, passing freely through the cationic exchange membrane. Each copper ion passing through the membrane replaces a copper ion in the catholyte that is plated out on the cathode. Thus, the total copper content of the catholyte does not significantly vary and the volume of copper sulfate does not change appreciably.

Chloride ions migrate to the anode and are discharged as chlorine gas, some of which is absorbed in the anolyte. Chloride ions can not pass through the membrane in any appreciable number so the deposit at the cathode is pure metallic copper.

With the divided cell of the invention, the copper is plated out, the chlorine is regenerated and easily recovered and recycled and the cupric chloride solution is depleted and can be recycled as a leach liquid, or it can, if desired, be passed over iron to recover the copper by cementation.

It should be obvious that other steps can be introduced in the described process, and, depending upon the material to be handled, such steps may be necessary. For example, as previously noted, one or more crushing devices can be used to reduce the particle size of the ore to that determined to be best for thorough chlorination. A dryer can also be positioned to dry the ore, or concentrate, prior to the chlorination, if desired. This reduces the moisture content of the ore and reduces the corrosiveness of the chlorine, since it is well known that moist chlorine is much more corrosive than is dry chlorine. Both the crushers and the dryer would be used in the process ahead of the chlorine retort.

The apparatus used for chlorinating the ore should be a closed retort so that gaseous chlorinization can occur. While it is possible to liquid chlorinate the ore and to thereafter recover the copper with electrolysis, in the manner here disclosed, the cost of the acid used, the chlorine lost and the special equipment required is usually prohibitive.

The leaching can be accomplished in a known countercurrent batch process, using a known type, counterflow, washing unit, such as is shown schematically at 14 in the drawing, with the gangue carried off by wash water. Alternatively, other known processes can be used. For example, a continuous slurrying process (not shown), wherein leach water is removed from thin layers of solids spread on a rotary drum filter, can be used.

In the chlorination process, regardless of the equipment used, certain reactions will occur. For example, if a chalcopyrite or ($CuFeS_2$) is chlorinated, the following reactions can be expected:

(1) $2CuFeS_2 + 5Cl_2 \rightarrow 2CuCl_2 + 2FeCl_3 + 4S$ (2) $2CuFeS_2 + 7Cl_2 \rightarrow 2CuCl_2 + 2FeCl_3 + 2S_2Cl_2$ and (3) $2CuFeS_2 + 5S_2Cl_2 \rightarrow 2CuCl_2 + 2FeCl_3 + 14S$ By experiment, it has been found that a very limited amount of the ferric chloride is formed in the presence of excess chlorine, at temperatures between 300° C. and 700° C., but this, together with the evolved sulfur, can be recovered from the chlorine retort. The copper emerges in the cupric form.

Cupric chloride is very soluble in water (707 grams per liter in cold, and 1080 grams per liter in hot water) and since most of the sulfur chlorides are removed during the chlorination process and the iron is relatively water insoluble, and that going into solution can be readily removed by subjecting the leach liquor to aeration and thereafter filtering out the ferric oxide that is formed, no significant reaction occurs during leaching, except that the cupric chloride goes into solution.

TABLE

| | Run #1 | | Run #2 | | Run #3 | |
|---|---|---|---|---|---|---|
| | Anolyte | Catholyte | Anolyte | Catholyte | Anolyte | Catholyte |
| Temperature (° C.): | | | | | | |
|   Initial | 25.5 | 25.5 | | | 28 | 29 |
|   Final | 39 | 37 | | | | |
| pH: | | | | | | |
|   Initial | 1.7 | 3.0 | 3.0 | 3.7 | 3.0 | 4.0 |
|   Final | 1.5 | 1.5 | | | 1.7 | 1.4 |
| Cu (g./l.): | | | | | | |
|   Initial | 15.7 | 20.0 | 16.4 | 23.9 | 24.9 | 27.3 |
|   Final | 4.2 | 13.4 | 5.6 | 18.4 | 4.9 | 9.0 |
| Cl (g./l.): | | | | | | |
|   Initial | | | 15.2 | 0.04 | | |
|   Final | | | 2.5 | 0.2 | | |
| Fe (g./l.): | | | | | | |
|   Initial | | | | | 1.3 | 0.0 |
|   Final | | | | | 1.2 | 0.1 |
| Cu deposition (gm.) | 123.0 | | 109.3 | | 242.3 | |
| Cu purity (percent) | 99.5 | | 98.6 | | 99.6 | |
| Amp-hours run | 156.8 | | 104.1 | | 222.7 | |
| Current efficiency (percent) | 93.0 | | 89.0 | | 91.3 | |
| Comments | Reagent grade CuSO₄ and CuCl₂ were used | | A minor mechanical leak developed in the membrane | | The solutions were not made up with chloride-free water | |

The net reactions occurring in the electrolytic cell during electrolysis, are as follows:

At the anode—$2Cl^- = Cl_2 + 2e$
At the cathode—$Cu^{++} + 2e = Cu$.

The results of three extended test runs, using apparatus as hereinafter described, are shown in the table above. For these tests the electrolytic cell was constructed of clear Lucite plastic panels, bonded together with acetic acid, and had a capacity of 11 liters. An Ionac MC–3470, Cation Exchange Membrane was sandwiched between two frames of Plexiglas and the frames were sealed to the side walls and bottom of the cell with silicone rubber cement. The anode was graphite and the cathode was a sheet of heavy stainless steel having a front surface area of 0.31 square feet. The back of the cathode was coated with a plastic spray so that all deposition would occur on the front.

The catholyte was a reagent grade cupric sulfated solution, containing molasses as a plating additive. A mechanical stirrer was used to agitate the solution and the anolyte was either a CP solution of cupric chloride, or the leach liquor.

A copper-iron sulfide flotation concentrate, 34.1% Cu and 23.5% Fe was pelletized in cylindrical sections 1/8 to 1/4 inch in height and 2 inches in diameter. Each reactor charge consisted of three pellets, and the charge weighed from 70 to 100 grams.

The chlorine reactor employed was a tube furnace having a 3 inch diameter Vycor tube and the ore was chlorinated for periods of from two to seven hours, at temperatures ranging from 450° C. to 700° C.

Typically, the product remaining after an ore containing 23.5% Fe and 34.1% Cu, was chlorinated and leached contained, as residue, 20 to 23% Fe with 0–2% having been volatilized or dissolved. This indicates that very small amounts of soluble iron chlorides are formed, and that the iron sulfides remain unreacted within the chlorination temperature range. The leach solution dissolved 47–59% of the copper that was originally charged into the chlorine reactor. Another 6% had volatilized in the furnace and therefore was not available for leaching.

The leach solution contained small amounts of soluble iron, but this was easily removed by aerating the solution overnight to oxidize the iron to ferric oxide, which was then filtered out.

The membrane was extremely effective, and prevented passage of virtually all chlorides and almost all iron.

From the table, it can be seen that the copper plated onto the cathode was of very high quality.

With the present invention, it is possible to electrolytically recover a very pure metallic copper; there is no significant loss of chemical; and an inexpensive leaching agent can be used. With ordinary skills, the process can be adapted to batch operations, or, if desired, to a continuous operation.

Although a preferred form of our invention has been herein disclosed, it is to be understood that the present disclosure is by way of example only and that variations are possible, without departing from the subject matter coming within the scope of the following claims, which subject matter we regard as our invention.

We claim:
1. Apparatus for use in recovering metallic copper comprising
   a chlorine reactor for receiving, chlorinating, and discharging copper bearing ore;
   leaching means arranged to receive said chlorinated ore from the reactor and for leaching said chlorinated ore and to discharge the leach liquor resulting therefrom; and
   a cationic exchange membrane divided electrolytic cell having an anode at one end thereof and a cathode at the other end thereof, with the exchange membrane sealingly dividing the cell therebetween, said cell being arranged to receive leach liquor from said leaching means at the side of said exchange membrane containing the anode.

References Cited
UNITED STATES PATENTS

| | | | |
|---|---|---|---|
| 1,137,874 | 5/1915 | McCaskell | 204—107 |
| 3,072,545 | 1/1963 | Juda et al. | 204—263 |
| 3,438,879 | 4/1969 | Kircher et al. | 204—263 |
| 3,222,267 | 12/1965 | Tirrell et al. | 204—263 |
| 664,537 | 12/1900 | Douglas | 204—107 |
| 720,235 | 2/1903 | Frasch | 204—107 |

JOHN H. MACK, Primary Examiner
W. I. SOLOMON, Assistant Examiner

U.S. Cl. X.R.
204—233, 257